(12) United States Patent
Chen et al.

(10) Patent No.: US 11,062,203 B2
(45) Date of Patent: Jul. 13, 2021

(54) NEUROMORPHIC COMPUTER WITH RECONFIGURABLE MEMORY MAPPING FOR VARIOUS NEURAL NETWORK TOPOLOGIES

(71) Applicant: Intel Corporation, Santa Clara, CA (US)

(72) Inventors: Gregory K. Chen, Portland, OR (US); Raghavan Kumar, Hillsboro, OR (US); Huseyin Ekin Sumbul, Portland, OR (US); Phil Knag, Portland, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1044 days.

(21) Appl. No.: 15/394,897

(22) Filed: Dec. 30, 2016

(65) Prior Publication Data
US 2018/0189645 A1   Jul. 5, 2018

(51) Int. Cl.
*G06N 3/063*   (2006.01)
*G06N 3/04*    (2006.01)

(52) U.S. Cl.
CPC .......... *G06N 3/0635* (2013.01); *G06N 3/049* (2013.01); *G06N 3/0445* (2013.01); *G06N 3/063* (2013.01)

(58) Field of Classification Search
CPC ........ G06N 3/0635; G06N 3/063; G06N 3/04; G06N 3/049; G06N 3/0445
See application file for complete search history.

(56) References Cited

U.S. PATENT DOCUMENTS

| | | | |
|---|---|---|---|
| 2007/0165547 A1* | 7/2007 | Lindwer | G06F 15/8023 370/256 |
| 2016/0266975 A1* | 9/2016 | Hu | G06F 12/1009 |
| 2018/0082181 A1* | 3/2018 | Brothers | G06N 3/0454 |
| 2018/0165575 A1* | 6/2018 | Henry | G06N 3/0454 |
| 2018/0174026 A1* | 6/2018 | Davies | G06N 3/063 |
| 2018/0189631 A1 | 7/2018 | Sumbul et al. | |
| 2018/0189648 A1 | 7/2018 | Sengupta et al. | |

FOREIGN PATENT DOCUMENTS

| | | | |
|---|---|---|---|
| EP | 1356430 A2 * | 10/2003 | ............... G06N 3/08 |
| EP | 3070649 A2 | 9/2016 | |
| WO | 2015053889 A2 | 4/2015 | |

OTHER PUBLICATIONS

Kim, Duckhwan. "Neurocube: A Programmable Digital Neuromorphic Architecture with High-Density 3D Memory," ACM SIGARCH Computer Architecture News, vol. 33, Jun. 2016, pp. 380-392. (Year: 2016).*

(Continued)

*Primary Examiner* — Li Wu Chang
(74) *Attorney, Agent, or Firm* — Alliance IP, LLC

(57) ABSTRACT

In one embodiment, a method comprises receiving a selection of a neural network topology type; identifying a synapse memory mapping scheme for the selected neural network topology type from a plurality of synapse memory mapping schemes that are each associated with a respective neural network topology type; and mapping a plurality of synapse weights to locations in a memory based on the identified synapse memory mapping scheme.

26 Claims, 11 Drawing Sheets

(56) References Cited

OTHER PUBLICATIONS

Nageswaran, Jayram. "A Configurable Simulation Environment for the Efficient Simulation of Large-Scale Spiking Neural Networks on Graphics Processors," Neural Networks 22, 2009, pp. 791-800) (Year: 2009).*
Jin, Xin. Efficient Modeling of Spiking Neural Networks on Scalable Chip Multiprocessor, 2008 IEEE International Joint Conference on Neural Networks (IEEE World Congress on Computational Intelligence), Hong Kong, 2008, pp. 2812-2819. (Year: 2008).*
Extended European Search Report issued in EP, Patent Application No. 17203931.5 dated May 2, 2018 (9 pages).
Francesco Galluppi, "A Hierachical Configuration System for a Massively Parallel Neural Hardware Platform", May 15, 2012, 10 Pages (183-192), ISBN: 978-1-45-031215-8.
U.S. Appl. No. 14/757,397, filed Dec. 23, 2015, entitled "Interconnection Scheme for Reconfigurable Neuromorphic Hardware," inventors Gregory Chen, et al.
U.S. Appl. No. 15/088,543, filed Apr. 1, 2016, entitled "Digital Neuromorphic Processor Design with Large Fan-in/out On-Chip Learning," inventors Gregory Chen, et al.
U.S. Appl. No. 15/392,407, filed Dec. 28, 2016, entitled "Neuromorphic Circuits for Sparse and Reconfigurable Connectivity," inventors Huseyin Ekin Sumbul, et al.
U.S. Appl. No. 15/394,976, filed Dec. 30, 2016, entitled "Event Driven and Time Hopping Neural Network," inventors Abhronil Sengupta, et al.
U.S. Appl. No. 15/395,231, filed Dec. 30, 2016, entitled "Neural Network With Reconfigurable Sparse Connectivity and Online Learning," inventors Huseyin Ekin Sumbul, et al.
EPO; Office Action issued in European Patent Application No. EP 17203931.5, dated Oct. 28, 2019; 7 pages.

\* cited by examiner

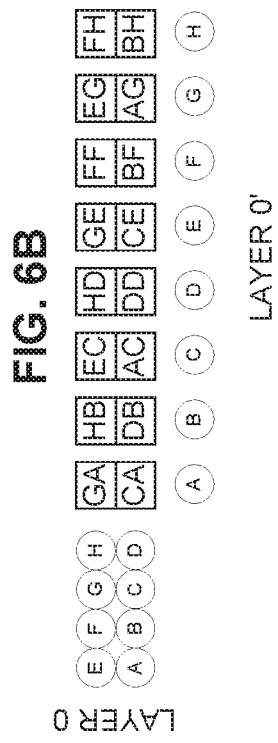
FIG. 6A
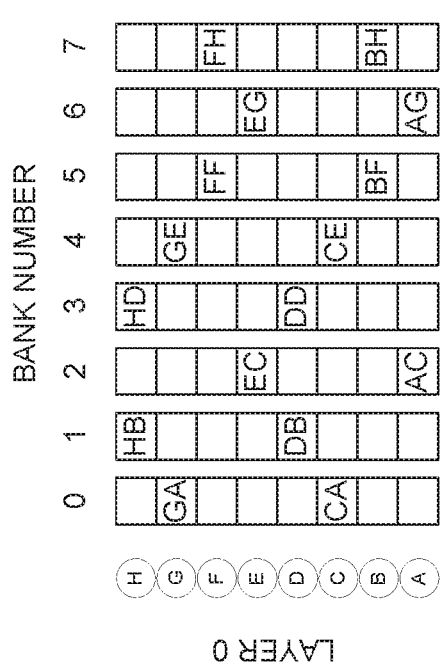
FIG. 6B
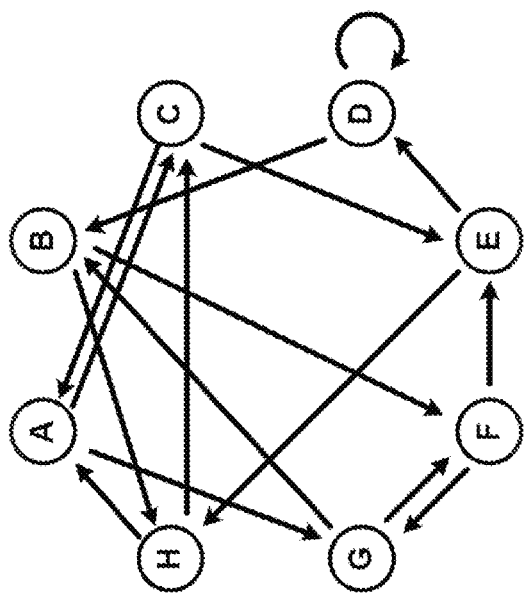
FIG. 6C
FIG. 6D
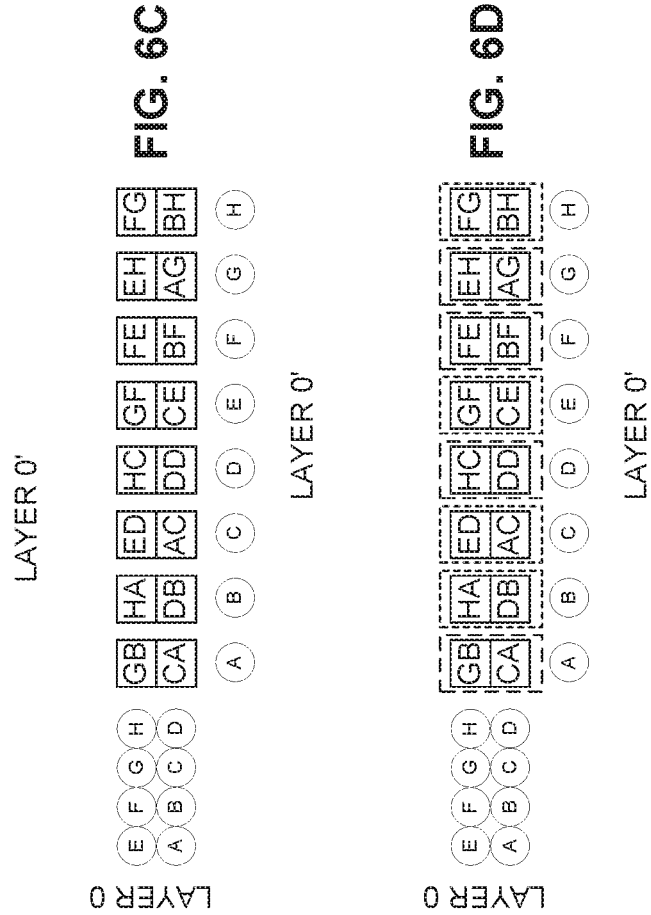
FIG. 6E

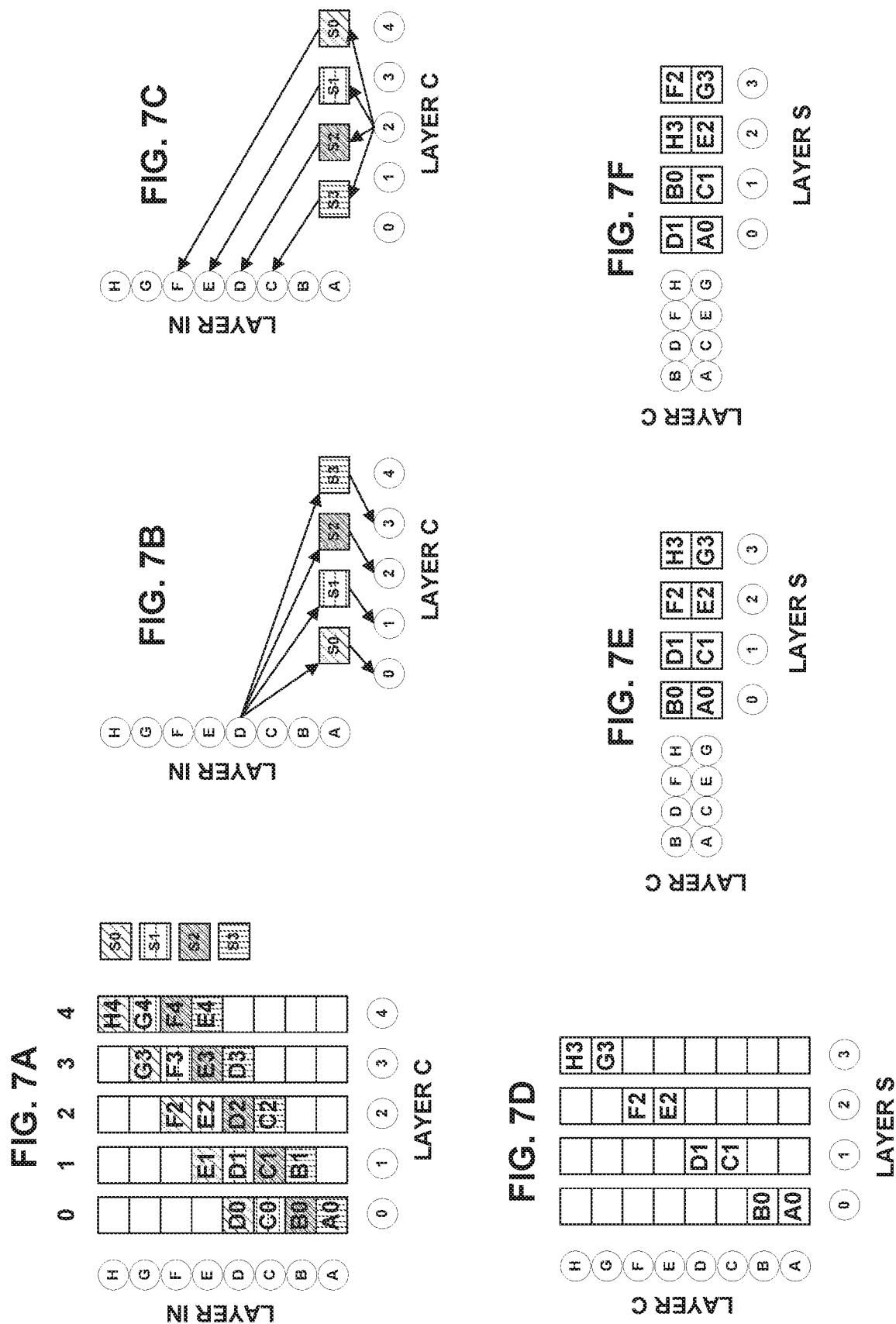

800

NEUROMORPHIC COMPUTER WITH RECONFIGURABLE MEMORY MAPPING FOR VARIOUS NEURAL NETWORK TOPOLOGIES

FIELD

The present disclosure relates in general to the field of computer development, and more specifically, to a neuromorphic computer with reconfigurable memory mapping for various neural network topologies.

BACKGROUND

A neural network may include a group of neurons loosely modeled after the structure of a biological brain which includes large clusters of neurons connected by synapses. In a neural network, neurons are connected to other neurons via links which may be excitatory or inhibitory in their effect on the activation state of connected neurons. A neuron may perform a function utilizing the values of its inputs to update a membrane potential of the neuron. A neuron may propagate a spike signal to connected neurons when a threshold associated with the neuron is surpassed. A neural network may be trained or otherwise adapted to perform various data processing tasks, such as computer vision tasks, speech recognition tasks, or other suitable computing tasks.

BRIEF DESCRIPTION OF THE DRAWINGS

FIG. 5A illustrates an example memory mapping scheme for a feed-forward neural network in accordance with certain embodiments.

FIG. 5B illustrates an example memory mapping scheme for a generative neural network in accordance with certain embodiments.

FIGS. 6A-6E illustrate example memory mapping schemes for a recurrent neural network in accordance with certain embodiments.

FIGS. 7A-7F illustrate example memory mapping schemes for a convolutional neural network in accordance with certain embodiments.

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computer systems, desktop computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
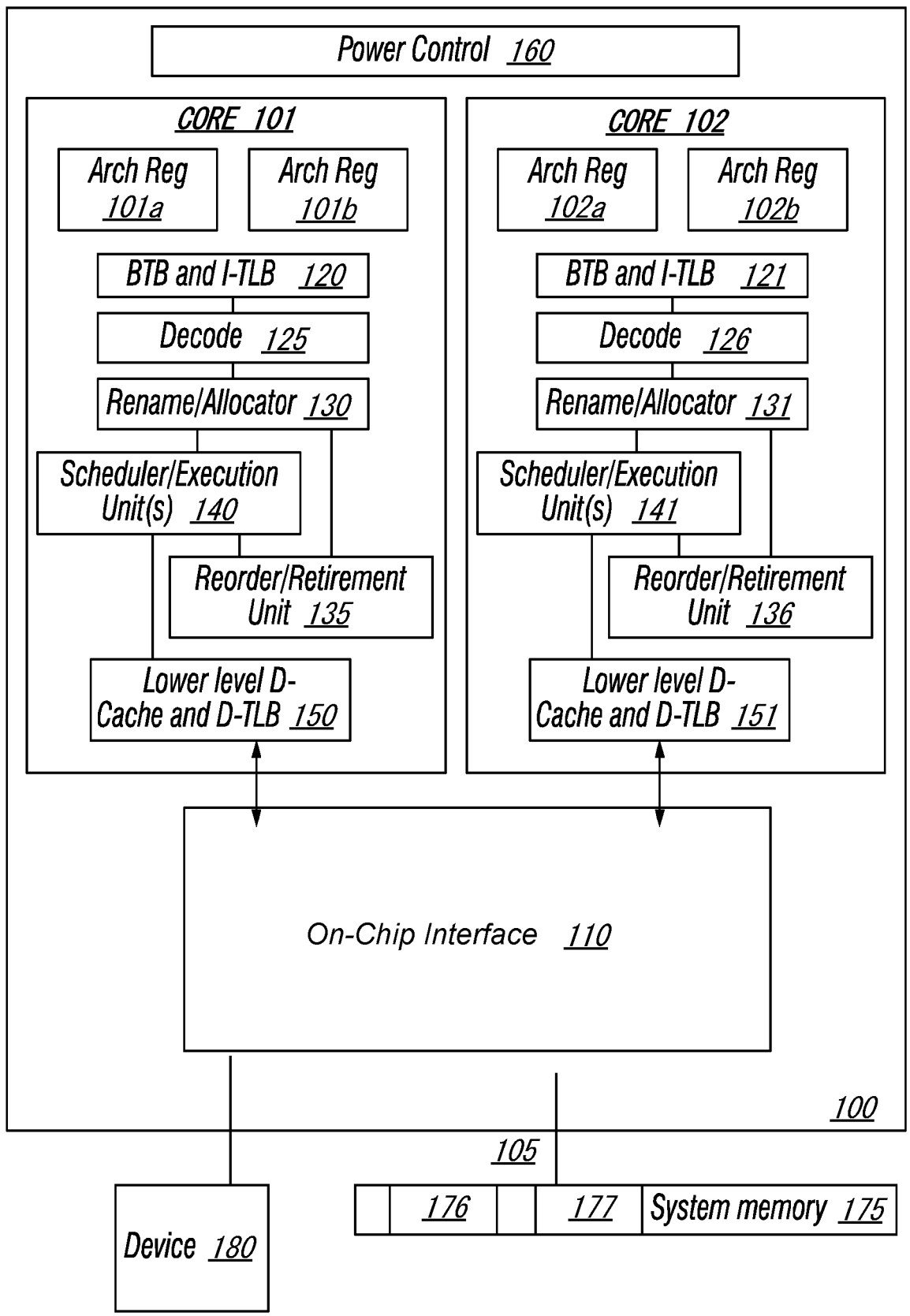
FIG. 1 illustrates a block diagram for an example computing system including a multicore processor that may implement a neural network in accordance with certain embodiments.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files (RFs) to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static random access memory (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
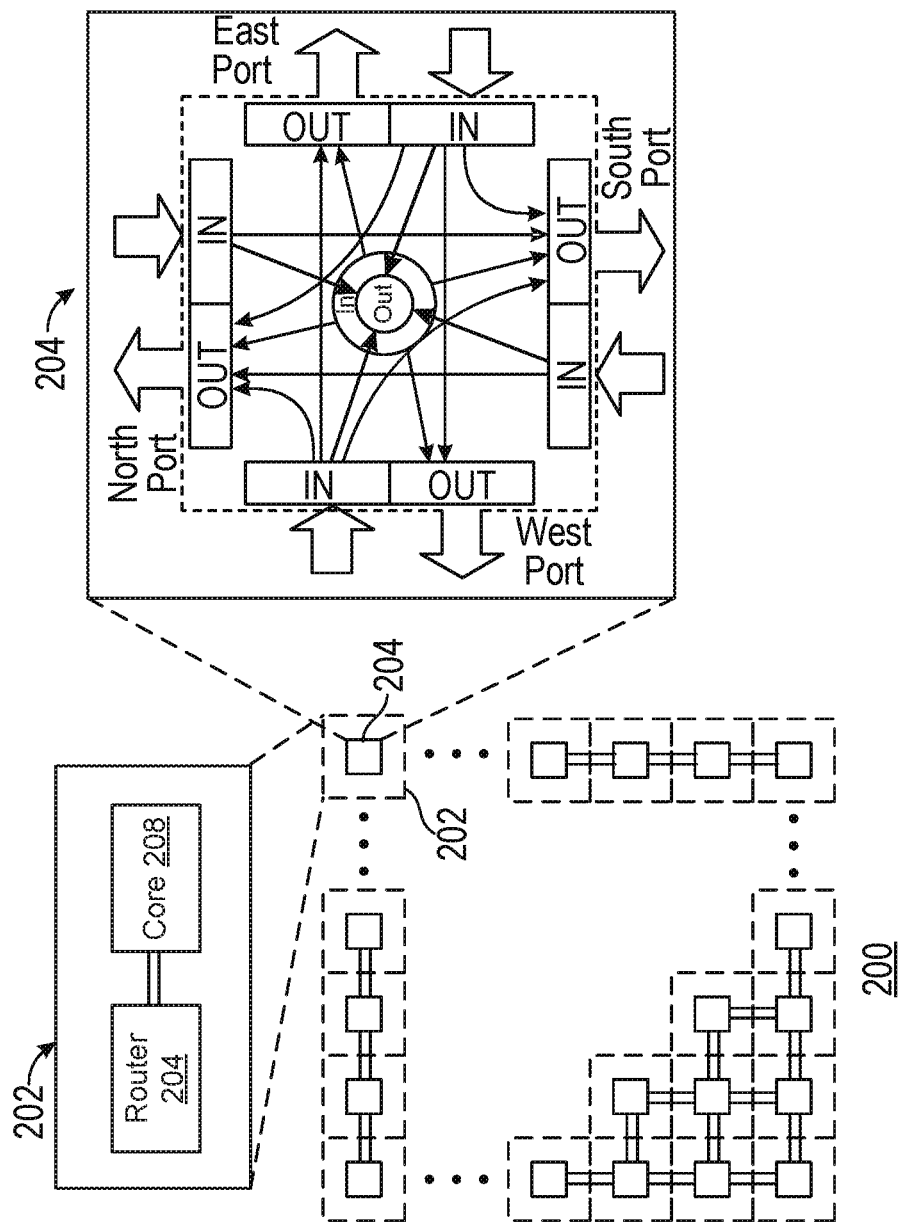
FIG. 2 illustrates a block diagram of a processor comprising a network on a chip (NoC) system that may implement a plurality of different neural networks having various topology types in accordance with certain embodiments.

FIG. 2 illustrates a block diagram of a processor 200 comprising a network on a chip (NoC) system that may implement a plurality of different neural networks having various topology types in accordance with certain embodiments. The processor 200 may include any processor or processing device, such as a microprocessor, an embedded processor, a digital signal processor (DSP), a network processor, a handheld processor, an application processor, a co-processor, an SoC, a hardware accelerator, or other device to execute code and/or perform other processing operations. In particular embodiments, processor 200 is implemented on a single die. Processor 200 may include any of the components of processor 100 and/or have any of the characteristics of processor 100.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. In the embodiment depicted, each network element 202 includes a router 204 and a core 208 (which in some embodiments may be a neuromorphic core), however in other embodiments, multiple cores from different network elements 202 may share a single router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 is communicatively coupled to its own core 208. In various embodiments, each router 204 may be communicatively coupled to multiple cores 208 (or other processing elements or logic blocks). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements or other logic blocks that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet-switched network. That is, the packet-switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. In some embodiments, the packet-switched network includes buffering logic because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. In other embodiments, the buffering logic may be omitted and packets may be dropped when collision occurs. The packets may be received, transmitted and processed by the routers 204. The packet-switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet-switched network and a circuit-switched network. Such a communication approach may be termed a hybrid packet/circuit-switched network. In such embodiments, packets may be variously communicated among the various routers 204 using resources of the packet-switched network and the circuit-switched network. In order to transmit a single data packet, the circuit-switched network may allocate an entire path, whereas the packet-switched network may allocate only a single segment (or interconnect). In some embodiments, the packet-switched network may be utilized to reserve resources of the circuit-switched network for transmission of data between routers 204.

Router 204 may include a plurality of port sets to variously couple to and communicate with adjoining network elements 202. For example, circuit-switched and/or packet-switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as logic of a "local" core 208. Herein, this port set will be referred to as a "core port set," though it may interface with logic other than a core in some implementations. In various embodiments, the core port set may interface with multiple cores (e.g., when multiple cores share a single router) or the router 204 may include multiple core port sets that each interface with a respective core. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

In particular embodiments, a core 208 of a network element may comprise a neuromorphic core including logic to implement one or more neurons and memory to store neural state parameters associated with the neurons. In various embodiments, a neuromorphic core may comprise any suitable logic for performing any of the functions described herein with respect to neurons. In particular embodiments, logic of a neuromorphic core that performs the functions of a neuron may be shared among multiple neurons of the core.

Figure 3:
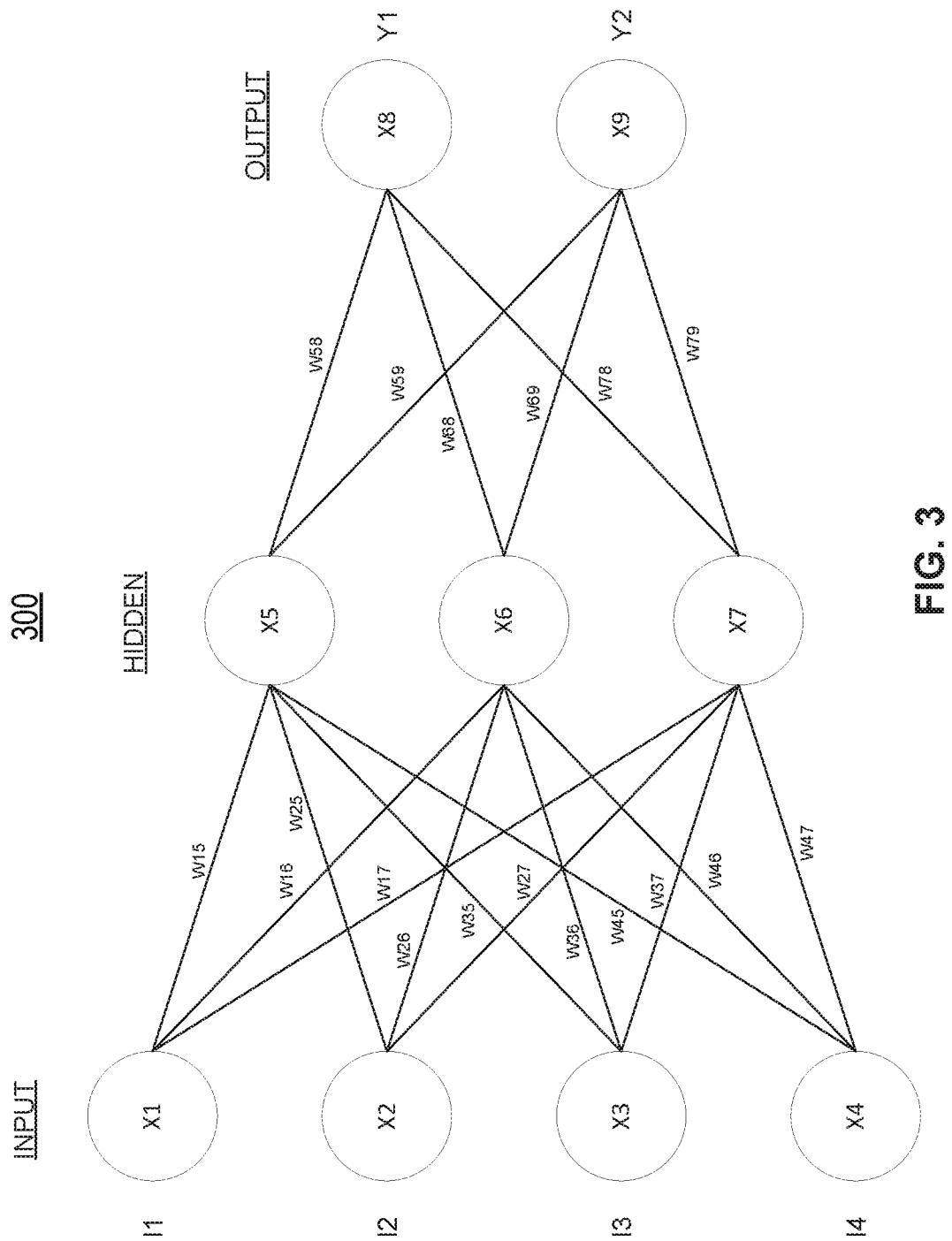
FIG. 3 illustrates an example portion of a neural network in accordance with certain embodiments.

FIG. 3 illustrates an example portion of a neural network 300 in accordance with certain embodiments. Neural networks can learn unknown functions from training data and can perform a large number of classification and recognition tasks. Network graphs corresponding to neural networks have neurons as the vertices and synapses as the weighted edges. Neurons integrate inputs from a large number of fan-in synapses and then apply a transfer function to generate a single output. Spiking neurons may output a binary value based on a thresholding function. Neural networks are universal approximators. By choosing the synapse weights, an appropriately sized neural network can learn any task. The backwards propagation of action potentials (from a neuron to its fan-in neurons) can implement either undirected connections or enable learning rules like spike timing dependent plasticity (STDP).

In the illustrated embodiment, the neural network 300 includes neurons X1-X9. Neurons X1-X4 are input neurons that respectively receive primary inputs I1-I4 (which may be held constant while the neural network 300 processes an output). Any suitable primary inputs may be used. As one example, when neural network 300 performs image processing, a primary input value may be the value of a pixel from an image (and the value of the primary input may stay constant while the image is processed). As another example, when neural network 300 performs speech or video processing the primary input value applied to a particular input neuron may change over time based on changes to the input speech or video.

In the embodiment depicted, each link between two neurons has a synaptic weight indicating the strength of the relationship between the two neurons. The synapse weights are depicted as WXY, where X indicates the pre-synaptic neuron and Y indicates the post-synaptic neuron. Links between the neurons may be excitatory or inhibitory in their effect on the activation state of connected neurons. For example, a spike that propagates from X1 to X5 may increase or decrease the membrane potential of X5 depending on the value of W15. In various embodiments, the connections may be directed or undirected.

In general, during each time-step, a neuron may receive any suitable inputs, such as a bias value or one or more input spikes from one or more other neurons. The bias value applied to a neuron may be a function of a primary input applied to an input neuron and/or some other value applied to a neuron (e.g., a constant value that may be adjusted during training or other operation of the neural network). In various embodiments, each neuron may be associated with its own bias value or a bias value could be applied to multiple neurons.

The neuron may perform a transfer function utilizing the values of its inputs and its current membrane potential. For example, the inputs may be added to the current membrane potential of the neuron to generate an updated membrane potential. As another example, a non-linear function, such as a sigmoid transfer function may be applied to the inputs and the current membrane potential. Any other suitable function may be used. The neuron then updates its membrane potential based on the output of the function. In some embodiments (e.g., in spiking neural networks), when the membrane potential of a neuron exceeds a threshold, the neuron may send spikes to each of its fan-out neurons (i.e., the neurons connected to the output of the spiking neuron). For example, when X1 spikes, the spike (and the appropriate synapse weights) may be propagated to X5, X6, and X7. As another example, when X5 spikes, the spikes (and the appropriate synapse weights) may be propagated to X8 and X9 (and in some embodiments to X2, X3, and X4 if the neuron is configured to send backward spikes to its fan-in neurons).

In a particular embodiment, one or more memory arrays may comprise memory cells that store neural state parameters, such as synapse weights, membrane potentials, thresholds, outputs (e.g., the number of times that a neuron has spiked), bias amounts, or other values used during operation of the neural network 300. The number of bits used for each of these values may vary depending on the implementation. In the examples illustrated below, specific bit lengths and/or component sizes (e.g., memory array sizes) may be described with respect to particular elements, but in other embodiments any suitable bit lengths and/or component sizes may be used.

The example of FIG. 3 provides a portion of just one example neural network topology of several known neural network topologies. Neural network topologies and machine learning algorithms may vary in their ability to perform applications such as speech recognition, financial data prediction, and object detection. Various different neural network topologies include, for example, neural networks with dense/sparse, structured/random, directed/undirected, or recurrent/feed forward connectivity. A hardware platform that may implement multiple different neural networks may benefit from reconfigurability, easy programmability, and low hardware overhead.

Typical neuromorphic computers may comprise tiles of cores. Each core contains a group of neurons and memory for fan-in synapses to those neurons. Within a core, synaptic connectivity is typically fully connected and directed (i.e., unidirectional) only. Output spikes from each core travel across the network to other cores. Such neuromorphic computers may be able to implement some dense and recurrent topologies. For example, these neuromorphic computers may be able to implement multi-layer perceptrons "MLPs" and some other very simple topologies (e.g., Hopfield networks, winner take all "WTA" networks) with acceptable overhead. However, to implement other topologies, large amounts of the synaptic memory would either be unused or replicated, leading to severe overhead due to synaptic memory being the primary area and energy component of the chip.

Various embodiments of the present disclosure provide a neuromorphic computer with a reconfigurable memory map and interconnection network that may be used to implement neural networks of various topologies or hierarchies of multiple neural network topologies. In various embodiments, the neuromorphic computer supports both sparse and dense connections between layers of neurons. The connectivity between neurons may be either structured or pseudorandom. The neuromorphic computer may enable either directed or undirected (unidirectional or bidirectional) synaptic connections between neurons. In various embodiments, the neuromorphic computer can implement MLPs, generative neural networks (e.g., Restricted Boltzmann Machines "RBMs" or Deep Belief Networks "DBNs"), feed-forward neural networks, recurrent neural networks (e.g., neural networks utilizing reservoir computing, such as Liquid State Machines "LSMs" or Echo State Networks "ESNs"), convolutional neural networks "CNNs" (e.g., deep CNNs, Convolutional DBNs), Hopfield networks, WTA networks, and/or other suitable neural network types. The neuromorphic computer may implement spiking neural networks (SNNs) or non-spiking neural networks (e.g., Artificial Neural networks).

Thus, various embodiments of the present disclosure may provide a reconfigurable neuromorphic computer that is capable of implementing (at any particular time) any one or more of various commonly used topologies for neural networks. In various embodiments, a neuromorphic computer connects neuron groups and synapse arrays in a multicast enabled network on chip (NoC). Various embodiments may utilize a combination of a few stored addresses, a butterfly operation, and simple address plus offset arithmetic to calculate target synapse and neuron addresses in the network. Particular embodiments may utilize connection schemes that allow for parallel access of synapse weights in both directions (i.e., fan-in or fan-out).

Various embodiments of the present disclosure may provide technical advantages. For example, the neural network topology type implemented by the neuromorphic computer may be configurable, thus allowing implementation of a neural network that is optimal for a particular processing task. In various embodiments, synapse weights may be stored in a manner that allow determination of the neurons associated with the synapse weights without the storage of pointers associated with the synapse weights, thus reducing the storage overhead significantly while still allowing for various connectivity schemes.

Figure 4:
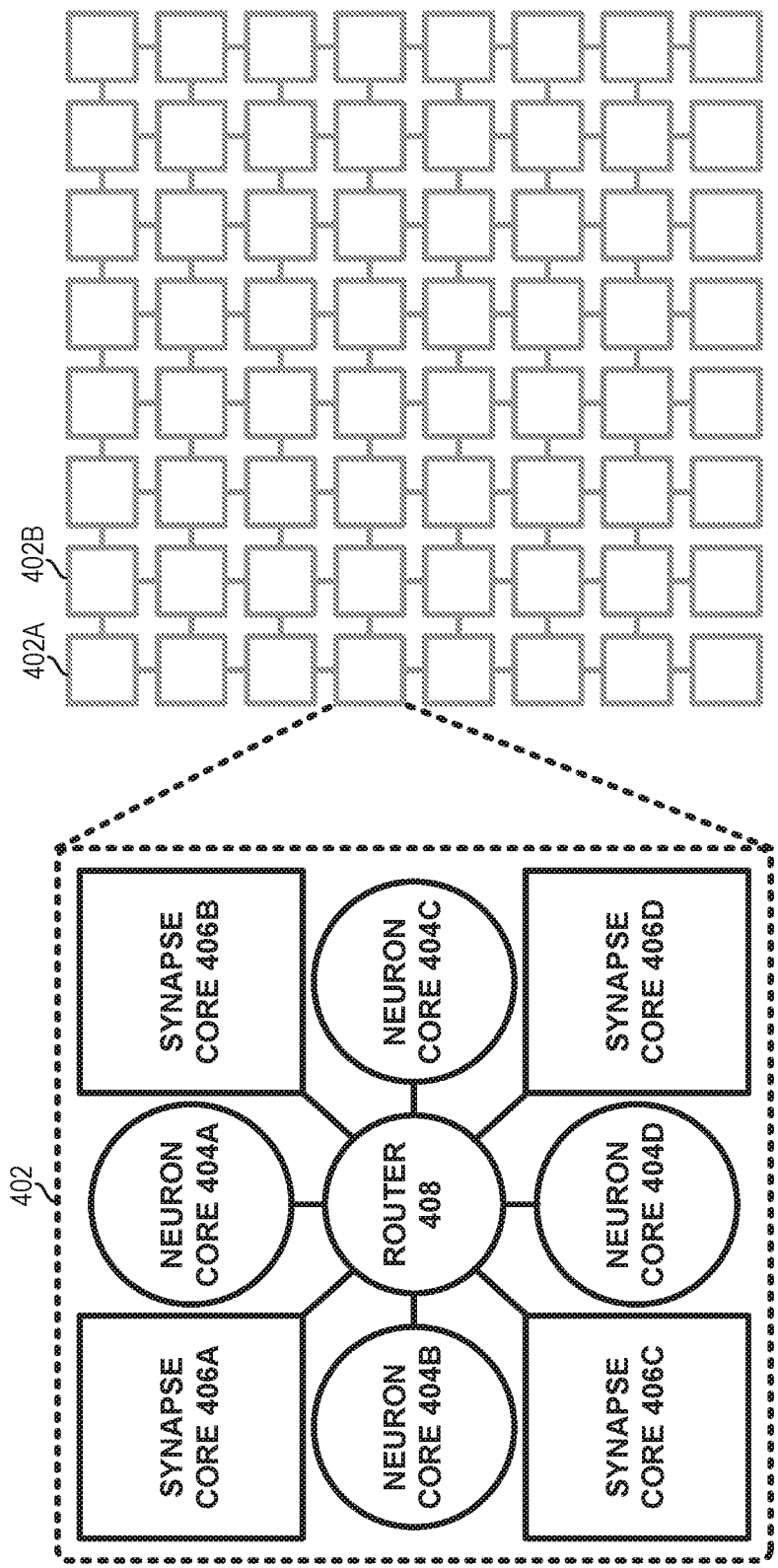
FIG. 4 illustrates an example system of neurosynaptic core clusters in accordance with certain embodiments.

FIG. 4 depicts an example system of neurosynaptic core clusters 402 in accordance with certain embodiments. In various embodiments, a neuromorphic processor may comprise one or more neurosynaptic core clusters. In the embodiment depicted, a neurosynaptic core cluster 402 includes four neuron cores 404A-D each comprising a number of neurons (e.g., 64 or other suitable number of neurons) that are connected with four synapse cores 406A-D through a router 408 (which may have any suitable characteristics of router 204 described above). In other embodiments, each neuron core 404 could be connected to its own router or the number of neuron cores 404 that are connected to a single router may be two, eight, or other suitable number, thus a neurosynaptic core cluster may include any suitable number of neuron cores and synapse cores connected to a router. In various embodiments, the neuron cores and synapse cores are modular and may be tiled with individual or shared routers depending on the availability of the hardware resources. In a particular embodiment, the system includes 256 neuron cores and 256 synapse cores tiled in 16×16 array.

The neurons of the neuron cores 404 perform the core arithmetic computations in a neural network. Each neuron core may comprise one or more computational logic blocks that are time-multiplexed across the neurons of the neuron core 404. A computational logic block may be operable to perform various calculations for a neuron, such as updating the membrane potential of the neuron, determining whether the membrane potential exceeds a threshold, and/or other operations associated with a neuron. Herein, reference herein to a neuron may refer to logic used to implement the neuron. Such logic may include storage for one or more parameters associated with the neuron and computational logic to update the membrane potential of the neuron. In some embodiments, the logic used to implement a neuron may overlap with the logic used to implement one or more other neurons (because in some embodiments the neuron may share computational logic with other neurons and control signals may determine which neuron is currently using the logic for processing).

Each synapse core 406 includes a synapse array memory and associated logic (e.g., logic to write synapse weights to the synapse array memory, access the synapse weights, and/or update the synapse weights). In various embodiments, a synapse core 406 may be collocated with a neuron core such that the neuron core may communicate directly with the synapse core 406 (as opposed to communicating with the synapse core 406 via a router).

Figures 5A, 5B:
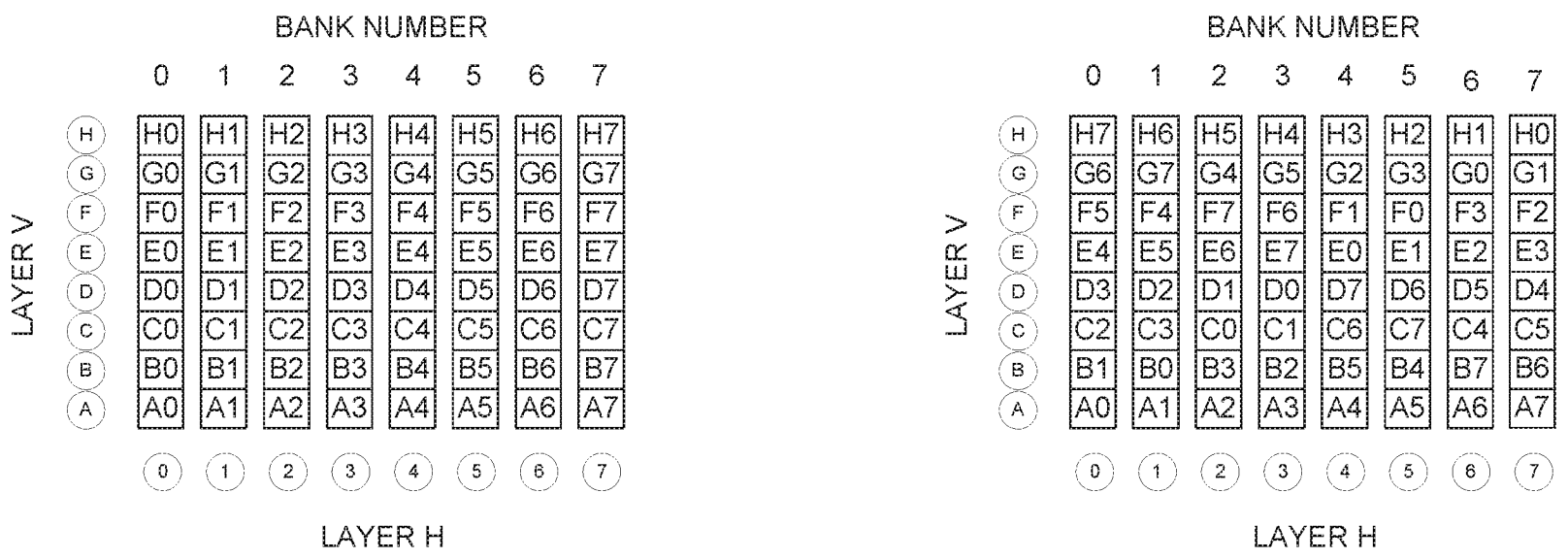

FIG. 5A illustrates an example memory mapping scheme for a feed-forward neural network in accordance with certain embodiments. A feed-forward neural network is one in which connections between neurons do not form a cycle (i.e., they do not go backwards nor do they connect neurons in the same layer to each other). Thus, in a feed-forward neural network, a neuron in a particular layer does not have a backwards connection to a neuron in a previous layer.

The memory mapping scheme depicted in FIG. 5A may be utilized for fully connected networks and multi-layer perceptrons. FIG. 5A depicts a mapping scheme for a neural network having full feed-forward connections between two layers of neurons (a visible layer V and a hidden layer H), that is, the neurons of a layer are each connected to all of the neurons of the next layer. Although particular layers are depicted, the same mapping scheme may be used between any two adjacent layers (e.g., input layer to hidden layer, hidden layer to another hidden layer, and/or hidden layer to output layer). The neurons are depicted as circles and the synapse weights as squares. The weight of the synapse connecting neuron A to neuron 0 is denoted as A0, and similar notation is used for all synapses (a similar notation may be used in the following figures as well). Using this scheme, the row and column of a particular synapse weight is determined by the neuron number in layer V and layer H respectively (where neuron number refers to the position of a neuron within an ordered list of neurons). For example, all synapse weights for neuron A are in row 0 (wherein the row numbers are in ascending order from the bottom), all synapse weights for neuron F are in row 5, all synapse weights for neuron 2 are in bank 2 (wherein the bank numbers are in ascending order from the left), and all synapse weights for neuron 7 are in bank 7.

Any suitable memory may be used to store the synapse weights. For example, in the embodiment depicted, a plurality of independently accessible memory banks (0-7) are used to store the synapse weights. In one embodiment, each bank may represent an 8-bit word SRAM, though other embodiments may utilize different sizes of memory and different types of memory. In various embodiments, the banks may be collocated (e.g., in the same synapse core) or may be dispersed throughout a processor (e.g., one or more banks may be in a first synapse core, one or more banks may be in a second synapse core, etc.). In various embodiments, the concept of memory banks disclosed herein may be generalized to any independently accessible portions of available synapse memory (e.g., memories located in different synapse cores, etc.).

Because each bank is independently accessible, each bank may be read simultaneously and thus an output from each bank may be obtained in parallel. Thus, the fan-out synapses for any particular neuron of layer V may be accessed in parallel, thus speeding up operation of the neural network. For example, the fan-out synapse weights of neuron A (synapse weights A0-A7) may be obtained by reading row 0 from each bank 1-7 in parallel. In another embodiment, the same effect can be achieved by putting all fan-out synapse weights in a shared memory access, such as the same word (e.g., SRAM word).

In addition to implementing fully-connected feed forward neural networks, the mapping scheme illustrated in FIG. 5A may also allow the neuromorphic computer to implement multi-layer perceptrons (MLPs). For example, an MLP may be formed by connecting a first layer of neurons to another layer of neurons in a similar fashion to that described above.

FIG. 5B illustrates an example memory mapping scheme for a generative neural network in accordance with certain embodiments. Generative neural networks may include, e.g., Restricted Boltzmann Machines and deep belief networks. In various neural networks (including generative neural networks), a signal may be sent from a neuron in a backwards direction (i.e., to the fan-in neurons). As one example, synapses may be undirected in generative neural networks. This means that, e.g., the connection from neuron A to 0 and connection from neuron 0 to A share the same synapse weight in memory. As another example, in order to implement certain learning techniques (e.g., STDP), a spiking neuron may send a backspike message to its fan-in neurons. STDP may utilize long-term depression (LTD) updates and long-term potentiation (LTP) updates. An LTD update decreases a synapse weight and is triggered when the fan-in neuron (i.e., pre-synaptic neuron) spikes after the fan-out neuron (i.e., post-synaptic neuron). Because the fan-out neuron spiked in the past, the timing information needed to update the synapse weight is available to the fan-out neuron. The LTP operation increments a synapse weight and is triggered when the fan-out neuron spikes after the fan-in neuron. Because a fan-out neuron may have many fan-in neurons (e.g., 1,000 or more in some embodiments), it may not be feasible for the fan-out neuron to store timing information of all of the fan-in neurons. Accordingly, when a fan-out neuron generates a spike, the fan-out neuron may multicast a backwards spike message towards all of its fan-in neurons. The backwards spike message may allow the fan-in neurons to determine whether to perform an LTP operation with respect to the respective synapse weights.

In the memory mapping scheme of FIG. 5A, the fan-in/fan-out (in various embodiments, neurons of layer V may be fan-in neurons or fan-out neurons to neurons of layer H) synapse weights of neurons of layer H are not accessible in parallel (because the fan-in/fan-out synapse weights of each neuron of layer H are located in the same bank). For example, neurons A-H are each fan-in/fan-out neurons to neuron 0, but each of the synapse weights A0-H0 are located in bank 0. In the mapping scheme illustrated in FIG. 5B, parallel access may be provided by butterflying the locations of the synapse weights in memory based on the neuron they are connected to in layer V. This results in the fan-in/fan-out neurons of a particular neuron having only one synapse weight in each of the memory banks. Accordingly, the fan-out/fan-in synapse weights for a particular neuron of either layer may be accessed in parallel.

In the embodiment depicted, the row in memory that stores synapse weights for a particular neuron of layer V is based on the neuron number of that neuron (e.g., the row may be equal or directly proportional to the neuron number). This is similar to the embodiment shown in FIG. 5A. For example, row 0 stores all of the synapses for neuron A, row 1 stores all of the synapses for neuron B, and so on. In the embodiment depicted, the bank number of memory that stores a synapse weight between a pair of neurons is determined by performing an XOR operation on the neuron number of the neuron of layer V (i.e., the row number) with the neuron number of the neuron of layer H. For example, the memory bank location of the synapse weight of the synapse between neuron H in row 7 (b111) and neuron 5 (b101) is b111 XOR b101=b010 (bank 2). Thus, target addresses to/from layer H can be easily computed by XORing the synapse memory bank number with the source/destination neuron number in layer V. For example, the target of synapse weight C3 in layer H is computed by XORing its row number (C=row number 2=b010) and bank number (b001), resulting in a target address of b011=neuron 3.

The mapping techniques herein scale for larger networks. For example, each layer may have any suitable number of neurons. Moreover, a neural network may have any suitable number of layers with each layer to layer synapse connection set implemented using a mapping scheme described herein.

FIGS. 6A-6E illustrate example memory mapping schemes for a recurrent neural network in accordance with certain embodiments. A recurrent neural network is one in which connections between neurons may form a cycle (e.g., neurons in the same layer may be connected to each other). In various embodiments, a neuromorphic computer may implement a reservoir computing network, such as a Liquid State Machine or Echo State Network. A reservoir computing network may have sparse, recurrent, and random connections between neurons in the reservoir. In this sense, random refers to the probability of a synapse existing between two neurons. However, purely random synapse locations are difficult to implement with acceptable overhead (e.g., due to the memory requirements for storing connectivity pointers for each synapse that specify which neurons the synapse is connected to).

FIG. 6A shows an example of the recurrent connectivity from layer 0 back to itself (layer 0'). In FIG. 6A, non-existent synapses are shown as blank (e.g., the value of the synapse weight remains 0 during the operation of the neural network and thus a synapse weight is not stored) while existent synapses are shown via the corresponding synapse weights identifying the connected neurons.

Various embodiments leverage flexibility in the network graph to choose pseudo random connections that map well to the memory used for the synapse arrays (which may also be used for dense arrays based on the neural network topology type implemented by the neuromorphic computer at a particular instance in time). In FIG. 6A, each group of 4 consecutive neurons in layer 0 (e.g., ABCD and EFGH) have exactly one synapse in each bank. In various embodiments, the pattern of connectivity for each group of 4 neurons may be repeated for other groups of 4 neurons in order to reduce complexity of the mapping logic. For example, in the embodiment depicted, bank 0 includes a synapse weight CA in row 2 (counting up from 0) and a synapse weight GA in row 6; bank 1 includes a synapse weight in row 3 and row 7, bank 2 includes a synapse weight in row 0 and row 4, and so on. Thus the connectivity of the bottom four rows is replicated for the top four rows in the depicted embodiment. The connectivity depicted in FIG. 5A could be based on any suitable pattern (e.g., a pattern generated by a random number generator or user defined pattern).

The connectivity mapping of FIG. 6A may be improved upon by condensing the synapse weights in memory, so as to more efficiently use the memory (and any unused partitions of memory could be turned off to save energy). For example, the synapse weights for each group of 4 neurons can be combined into one row as shown in FIG. 6B (this is possible since each bank includes a single synapse for each neuron of the group of 4 neurons).

In a particular embodiment, each synapse bank may contain a stored value to determine which neurons of layer 0 are connected to the synapse weights stored by the bank (the layer 0' connections simply track the bank number). For example, synapse bank 0 (the first synapse bank from the left) of FIG. 6B (which stores synapse weights CA and GA) always connects to the third neuron in each group of 4 neurons (e.g., C in ABCD, G in EFGH) and thus synapse bank 0 would store an indication of such (e.g., a binary value of b10 representing the third neuron). The particular neuron of layer 0' connected to a synapse would be determined based on this indication and knowledge of the group of four neurons associated with the synapse row number.

In various embodiments (including at least any of those described herein with respect to FIGS. 5A, 5B, 6A-6E, 7A-7F, and 8), traffic between neurons and synapses may be packetized and transferred via a NoC (e.g., from a neuron core to a synapse core or vice versa). In a particular embodiment, an event (e.g., a spiking event) at a neuron may result in the neuron sending a multicast message or a broadcast message to one or more synapse cores to access fan-in and/or fan-out synapse weights (identified by target addresses) of the neuron sending the message. In a particular embodiment, this may then result in the one or more synapse cores sending the accessed weights to the destination neurons via unicast messages.

In various embodiments, a group of target memory addresses of synapse weights of a multicast message from a neuron may be concisely represented using a wildcard masked address, although any alternative addressing mechanism may be used. For example, the address X010 may refer to addresses 1010 and 0010. The number of wildcard bits in the multicast address dictates the number of target addresses encoded in the multicast address. In a particular embodiment, address bits are grouped into pairs in order to enable the encoding of the wildcard X bit. As an example, "11" may represent a logic 1 bit, "00" may represent a logic 0 bit, and "10" or "01" may indicate a wildcard X bit.

In a memory mapping scheme in accordance with the embodiment described in FIG. 6B (and other embodiments disclosed herein), multicast fan-out synapse addresses for messages sent by a neuron may be encoded using wildcard masked addresses that are stored and accessible to each neuron. As an example, the addresses of the banks storing the fan-out synapses for neuron D may be represented as 0X1 (indicating bank 1 which stores DB and bank 3 which stores DD) and the addresses for neuron A may be represented as X10 (indicating bank 2 which stores AC and bank 6 which stores AG).

In various embodiments, each neuron could also (or alternatively) store a wildcard representation of the compact representation (wildcard) of all the fan-in synapse addresses. Accordingly, a connection memory that stores connectivity per synapse may be avoided according to various embodiments described herein.

While the connectivity mapping depicted in FIG. 6B is memory efficient, parallel access of fan-in synapse weights is not available because of collisions in synapse mapping to memory banks. For example, the fan-in synapse weights CA and GA for neuron A are both located in bank 0. In various embodiments, parallel access may be provided by performing a butterfly option on the layer 0' neuron connected to each synapse, based on its row in layer 0, while the layer 0 neuron connection is unchanged. The result of this operation is shown in FIG. 6C. This operation changes the network connectivity (i.e., the connectivity depicted in FIG. 6C is not the same as the connectivity shown in FIGS. 6A and 6B), but has no impact on algorithm performance since random connectivity is desirable for these types of neural networks. The resulting connectivity for the random reservoir is shown in FIG. 6E.

In the embodiment depicted, after the butterfly operation, the row in memory that stores synapse weights for a particular neuron of layer 0 has not changed and thus the neuron from layer 0 connected to a synapse may be determined based on knowledge of the bank number and the connectivity pattern described with respect to FIGS. 6A and 6B. The neuron from layer 0' that is connected to a particular synapse may be determined based on an XOR operation between the row number and the bank number of the synapse.

In various embodiments, synapse banks may be combined to align with physical memory requirements. For example, FIG. 6D shows two different groups of banks that could be combined (i.e., the synapse weights shown as being in different banks could be placed in the same bank) while still providing for parallel access of fan-out and/or fan-in synapses weights for any of the neurons. The first group (including banks 0, 3, 4, and 6) and the second group (including banks 1, 2, 5, and 7) each include only one of every synapse connected to a neuron of layer 0' (whereas if the group included two synapses connected to the same neuron of layer 0' then the fan-in synapses for that neuron would not be accessible in parallel). In general, banks with addresses having a large Hamming distance from each other (the Hamming distance between two addresses is equal to the number of bits that differ between the binary representation of the two addresses) can safely be combined with no chance of collision using wildcard masked addressing.

In the various embodiments depicted in FIGS. 6A-6E a 25% sparsity ratio is used (wherein one out of every four possible connections exists, i.e., has a non-zero synapse weight stored in a synapse array). However in other embodiments, other sparsity ratios may be used. In general, if the selected sparsity ratio dictates that one out of every N connections exists, then the neurons are divided into groups of N and mapped to the memory in a manner similar to any of the embodiments described above.

FIGS. 7A-7F illustrate example memory mapping schemes for a convolutional neural network in accordance with certain embodiments. Convolutional networks are used to perform various computer vision tasks and have structured connectivity in alternating convolutional and pooling layers. Convolutional networks may provide scale and translation invariance, particular for 2D problem sets such as images. The convolutional layers may provide translation invariance and the pooling layers may provide scaling invariance.

FIG. 7A illustrates a conceptual diagram of an example connectivity scheme between an input layer (Layer IN) and a convolutional layer (Layer C). Each neuron in layer C is connected to a patch of multiple neurons in layer IN through synapses S0-S3. The synapse weights and their respective memory locations are shared among all patches for one feature map (e.g., D0=E1= . . . =H4=S0), thus the synapse weights are each stored in a single location. This may be conceptualized as a filter comprising the synapse weights sliding through the different patches of the input layer to create the feature map. To implement the convolutional operation, in one embodiment, all overlapping patches (e.g., A-D, B-E, C-F, etc.) in an input layer (e.g., the input image or a pooling layer) are connected through shared synapse weights to a target neuron in layer C. In another embodiment, not all overlapping patches are used. For example, instead of striding through the input neurons in increments of one neuron (e.g., pixel) as in the example shown, the patches may stride through the input neurons in increments of two neurons, four neurons, or other number of neurons.

The target neuron location is based upon the position of the patch in the input layer. Various embodiments may perform arithmetic operations utilizing the addresses of the source neuron and the synapse weight to compute the target address. FIG. 7B illustrates the flow for a forward spike (or forward propagation of another signal) of a neuron D of an input layer. As illustrated in FIG. 7A, the neuron D is conceptually connected to neuron 0 through S0, neuron 1 through S1, neuron 2 through S2, and neuron 3 through S3. Accordingly, when neuron D spikes, the spike fans out to the synapse weights S0-S3 and to the target neurons 0-3. The target addresses for the spike (i.e., the addresses of the target neurons of layer C) are computed based on the address of the corresponding synapse weight and the input neuron number (which may correspond to an address of the neuron, such as a memory row address). As an example, the address of a target neuron in layer C for a given neuron from layer IN and a particular synapse may be computed as the neural number of the neuron in layer C+number of the synapse+an offset (e.g., based on the size of the patch). Assuming an offset of −3, for neuron D (neural number=3), the target neuron associated with synapse S0 (synapse number=0) is 0, the target neuron associated with synapse S1 (synapse number=1) is 1, the target neuron associated with synapse S2 (synapse number=2) is 2, the target neuron associated with synapse S3 (synapse number=3) is 3.

Addresses for a backwards spike (or other backwards propagating signal) may be computed in a similar manner. Backwards spikes are useful to either implement STDP in SNNs, or to implement convolutional deep belief networks, a class of neural networks with both CNN connectivity and generative properties. An example backwards spike is depicted in FIG. 7C. The target addresses for the spike (i.e., the addresses of the target neurons in layer IN) are computed based on the address of the corresponding synapse weight and the number of the neuron spiking. As an example, the address of a target neuron in layer IN for a given neuron from layer C and a particular synapse may be computed as the neural number of the neuron in layer IN−number of the synapse+an offset (e.g., based on the size of the patch). Assuming an offset of +3, for neuron 2 (neural number=2), the target neuron associated with synapse S3 (synapse number=3) is C (neural number=2), the target neuron associated with synapse S2 (synapse number=2) is D (neural number=3), the target neuron associated with synapse S1 (synapse number=1) is E (neural number=4), and the target neuron associated with synapse S0 (synapse number=3) is F (neural number=5).

FIG. 7D illustrates a conceptual diagram of an example connectivity scheme between a convolutional layer (Layer C) and a subsampling layer (layer S). For the pooling operation, non-overlapping patches in the convolutional layer are connected to one target neuron in the subsampling (i.e., pooling) layer. The conceptual connectivity requirements are shown in FIG. 7D and represent a subset of the sparse connectivity requirements for reservoir computing. Similar techniques to those described above in connection with FIGS. 6A-6E may be used to provide parallel access of both fan-out and fan-in synapse weights (via, e.g., multicast operations).

FIG. 7E illustrates the synapse weights compressed into two rows among 4 banks. Because the pooling operation utilizes structure connectivity, the connectivity is not altered when the butterfly operation is performed to generate the memory mapping scheme depicted in FIG. 7F. This may be accomplished by moving the entire synapse with the butterfly operation, instead of only changing the address in layer S (analogous to layer 0' of FIGS. 6A-6D). For back-propagating action potentials, the synapse bank to be accessed is calculated by taking the neuron number in layer C and XORing it with the synapse row number. For example, when neuron 1 in layer S accesses a synapse D1 in row 1, the neuron accesses bank 0 (001 XOR 001=0). The destination neuron in layer C is calculated through structured ordering of neurons in layer S sharing a synapse row. For example, neuron 2 in layer S accesses the $2^{nd}$ neuron within a group of neurons in layer C sharing a row (i.e., E within ACEG and F within BDFH).

Figure 8:
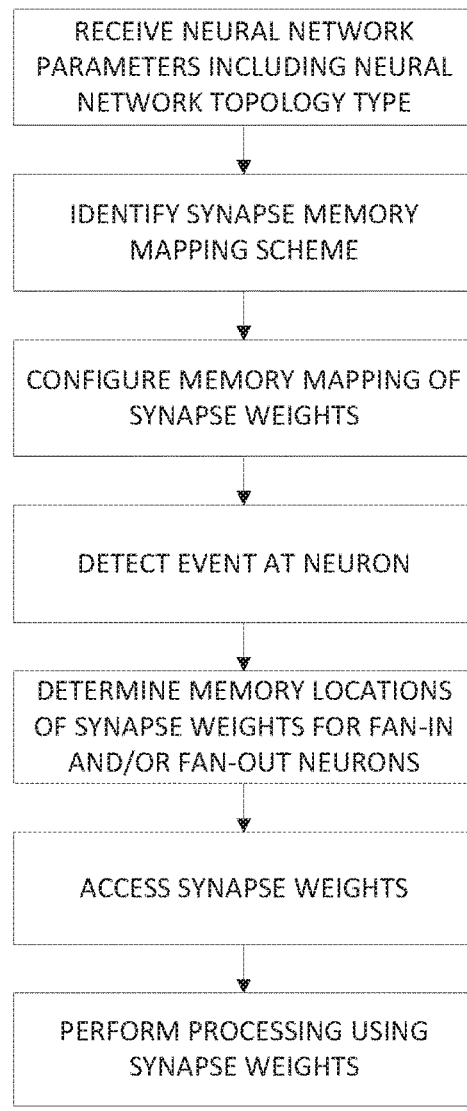
FIG. 8 depicts an example flow for mapping and accessing synapse weights in accordance with certain embodiments.

FIG. 8 depicts an example flow for mapping and accessing synapse weights in accordance with certain embodiments. The various operations may be performed by any suitable logic of a neuromorphic processor. At 802, neural network parameters are received. The neural network parameters may include a selection of a neural network topology type of a plurality of neural network topology types that may be implemented by a neuromorphic computer. The neural network parameters may include any other suitable parameters. For example, the parameters may include size parameters, such as the number of neurons in the neural network, the number of layers in the neural network, the number of neurons per layer, and/or other suitable size parameters. As another example, the parameters may include synapse weight value parameters, such as the signs and magnitudes of synapse weights of the neural network. In various embodiments, the weight value parameters may be determined during a training process of a neural network that is performed, e.g., by one or more processors of a computer system and/or via other means. As another example, the parameters may include one or more neuron bias values to be applied to each neuron at each time-step of the neural network. As another example, the parameters may include one or more sparsity values indicating the frequency of connections between neurons.

At 804, a synapse memory mapping scheme is identified. The synapse memory mapping scheme may be identified based on the selected neural network topology type. In various embodiments, a plurality of neural network topology types that may be implemented by a neuromorphic processor include fully connected neural networks, sparsely connected neural networks, multi-layer perceptrons, feed-forward neural networks, generative neural networks (e.g., Restricted Boltzmann Machines or Deep Belief Networks), recurrent neural networks (e.g., neural networks utilizing reservoir computing, such as Liquid State Machines or Echo State Networks), convolutional neural networks "CNNs" (e.g., deep CNNs, Convolutional DBNs), Hopfield networks, WTA networks, and/or other suitable neural network topology types. Various embodiments may include neuromorphic processors that are able to implement any subset of these neural network topology types. In various embodiments, each neural network topology type is associated with a corresponding memory mapping scheme.

At 806, memory mapping of synapse weights of the neuromorphic processor is configured based on the selected synapse memory mapping scheme. The configuration may include determining the locations of synapses of the neural network (e.g., determining which neurons are connected via synapses) and the locations in memory in which the weights of the synapses are to be stored. In various embodiments, the configuration may include configuring logic that is to generate target addresses for synapse weights and/or neurons (e.g., the logic may generate an address for a target synapse based on an input neuron or an address for a target neuron based on an address of a synapse weight). In various embodiments, the configuration may include generating addresses of the fan-out synapses (i.e., the synapses connected to the fan-out neurons) and/or fan-in synapses (i.e., the synapses connected to the fan-in neurons) for each neuron of the neural network and storing the addresses in a manner accessible to the neurons (e.g., in a memory of a neuron core).

At 808, an event is detected at a neuron. For example, the event may be an event (such as a spiking operation) that initiates the sending of one or more messages to fan-in and/or fan-out neurons of the neuron. At 810, the neuron determines memory locations of the synapse weights associated with the fan-in and/or fan-out neurons and sends one or more messages to cause access of the synapse weights. At 812 the synapse weights are accessed. In various embodiments, all or a subset of the synapse weights may be accessed in parallel. At 814, processing is performed using the accessed synapse weights. For example, membrane potentials may be updated and/or synapse weight values update via a learning algorithm. The flow may then loop back to 808.

Figure 9:
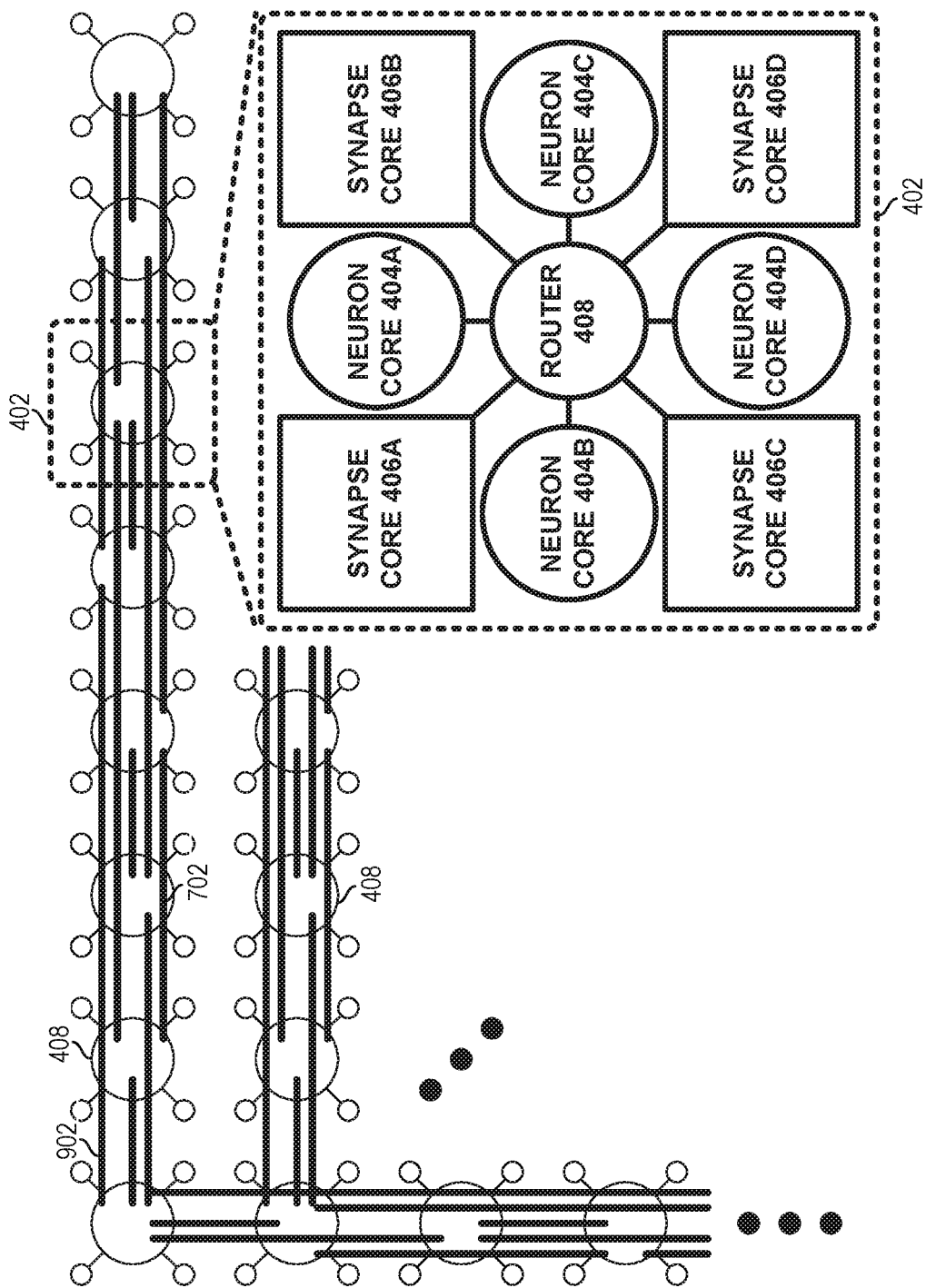
FIG. 9 depicts an example connection scheme of a portion of a neuromorphic processor in accordance with certain embodiments.

FIG. 9 depicts an example connection scheme of a portion of a neuromorphic processor in accordance with certain embodiments. In some embodiments, each router 408 may have a binary address (e.g., assigned in accordance with Cartesian coordinates of the router on the NoC) and is connected to other routers 408 having a Hamming distance of one (i.e., those routers whose address differs only by a single bit). In various embodiments, the maximum number of hops per transfer scales logarithmically (base 2) with the total number of routers (e.g., if there are 64 routers, the maximum number of hops is $\log_2^{64}=6$). For example, if the NoC included 16 routers, a router with address 0000 would be connected to routers with addresses 0001, 0010, 0100, and 1000. In the embodiment depicted, this connection scheme is implemented by the routers being connected via links 902 that have various lengths. This connection scheme may offer a more richly connected environment than a simple mesh, thus reducing the number of messages that are dropped during operation and/or decreasing buffer requirements (in embodiments wherein the messages are buffered). In a particular embodiment, the NoC that implements the neural network is physically arranged as a 2-ary (indicating a Hamming distance of one between each router) 6-flattened-butterfly network (indicating 64 total routers as $2^6=64$). However, in various embodiments, routers 408 may be connected in any suitable manner to couple the neuron cores and the synapse cores of the neurosynaptic core clusters 402 together. In various embodiments, communication across the neural network is based on wildcard masked multicasting which allows for simultaneous message delivery to multiple cores over the network. The forking behavior of this implementation matches the wildcard masked addressing communication. By introducing wildcard (i.e., "don't care" bits) into the multicast address, a neuron core may send information to multiple synapse cores indicated by the position and number of wildcard bits. In various embodiments, at least a portion of a synapse core address is the address of the router connected to the corresponding neuron synapse core (e.g., the router that includes a port connected to the synapse core).

In an example 16 router system with each router having a unique 4-bit address, a multicast address "1X0X", where X indicates the wildcard bit, represents routers 1000, 1001, 1100, and 1101. As other examples, the address XXXX may represent all cores (a broadcast), and any address without an X would represent a single core (a unicast message). The number of wildcard bits in the multicast address dictates the number of recipient cores and the positions of the wildcard bits indicate the addresses of these cores. In a particular embodiment, address bits are grouped into pairs in order to enable the encoding of the wildcard X bit. As an example, "11" represents a logic 1 bit, "00" represents a logic 0 bit, and "10" or "01" indicates a wildcard X bit. As a result, in an 16×16 core array where core addresses are 8 bits long, 16 bits would be used to represent the wildcard masked multicasting addresses.

Figure 10:
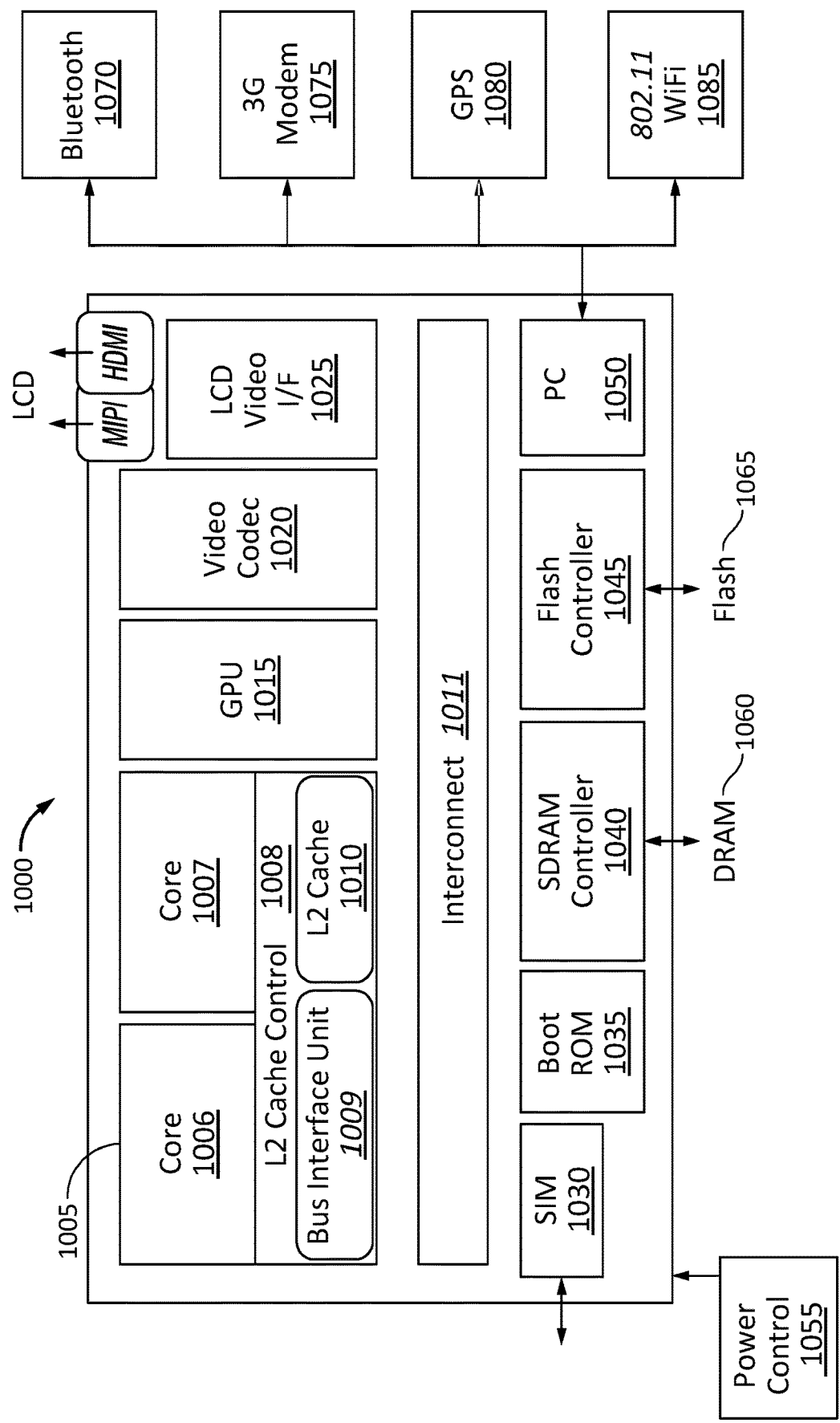
FIG. 10 illustrates a block diagram for an example computing system that may implement a plurality of different neural networks having various topology types in accordance with certain embodiments.

In FIG. 10, an embodiment of a system on-chip (SOC) design in accordance with the disclosures is depicted. In a particular embodiment, an SOC may implement a neural network as described herein. As a specific illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Similar to the discussion above, cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000.

Interconnect 1011 includes an on-chip interconnect, such as an IOSF, AMBA, or other interconnect discussed above, which potentially implements one or more aspects of the described disclosure. Any of these components may incorporate aspects of the disclosure described herein.

Interconnect 1011 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein.

In addition, the system illustrates power control 1055 and peripherals for communication, such as a Bluetooth module 1070, 3G modem 1075, GPS 1080, and WiFi 1085. Note as stated above, a UE includes a radio for communication. As a result, these peripheral communication modules are not all required. However, in a UE some form a radio for external communication is to be included.

Figure 11:
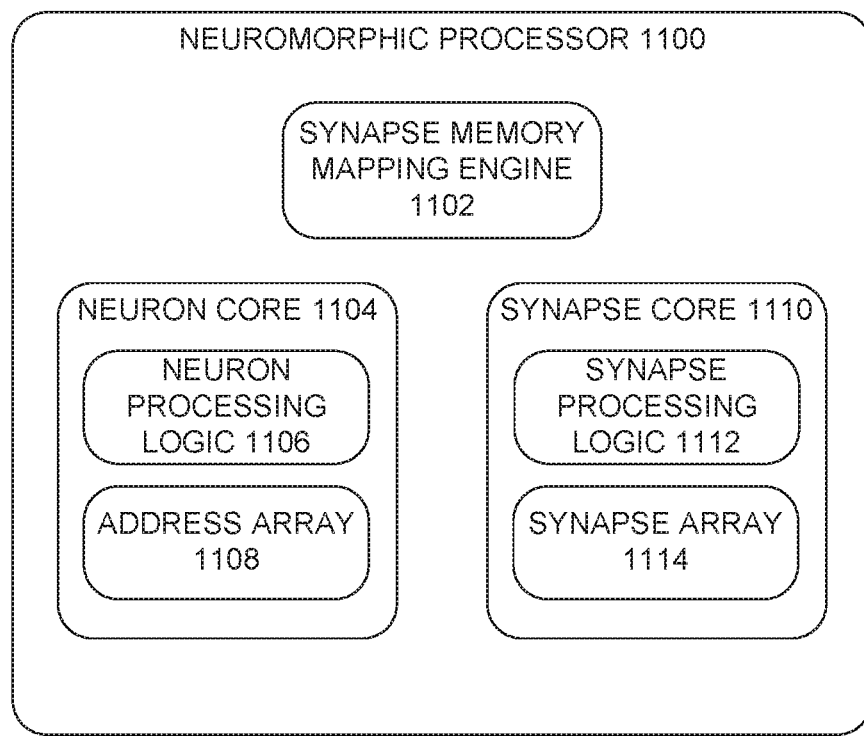
FIG. 11 illustrates an example neuromorphic processor 1100 in accordance with certain embodiments.

FIG. 11 illustrates an example neuromorphic processor 1100 in accordance with certain embodiments. Neuromorphic processor 1100 includes synapse memory mapping engine 1102, at least one neuron core 1104 and at least one synapse core 1110. The synapse memory mapping engine may be operable to receive a selected neural network topology type, identify a synapse memory mapping scheme associated with the network topology type, and configure the neuron core(s) and/or synapse core(s) based upon the synapse memory mapping scheme and other neural network parameters. Synapse memory mapping engine 1102 may also be operable to reconfigure the neuromorphic processor 1100 upon the selection of a different neural network topology type. Synapse memory mapping engine may utilize any suitable logic to describe the memory mapping functions described herein (various examples of logic that could be used to implement the synapse memory mapping engine are described below).

Neuron core 1104 (which may include any suitable characteristics of any of the neuron cores described herein) implements a plurality of neurons via neuron processing logic 1106 and address array. Neuron processing logic may include any suitable logic to update membrane potentials of the neurons based on any suitable parameters and to initiate communications between the neurons. Address array 1108 may include addresses of fan-out and/or fan-in synapse weights for the various neurons.

Synapse core 1110 (which may include any suitable characteristics of any of the synapse cores described herein) includes synapse processing logic 1112 and synapse array 1114. The synapse processing logic 1112 may include logic to access and/or update synapse weights stored in the synapse array 1114. In various embodiments, synapse processing logic 1112 may include logic to generate target neuron addresses for synapse weights accessed by the logic 1112 (e.g., based upon any of the memory mapping schemes described herein).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components (or subcomponents of these components) such as processor 100, router 204, core 208, the neurons, neuron cores 404, synapse cores 406, routers 408, system 1000, neuromorphic processor 1100, synapse memory mapping engine 1102, the various memory arrays, or other component described herein. "Logic" may refer to hardware, firmware, software and/or combinations of each to perform one or more functions. As an example, logic may include hardware, such as a micro-controller or processor (such as any of the processors described herein), associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a memory to store a plurality of synapse weights of a neural network; at least one neuron core comprising logic associated with a plurality of neurons; a synapse memory mapping engine to receive a selection of a neural network topology type; identify a synapse memory mapping scheme for the selected neural network topology type from a plurality of synapse memory mapping schemes that are each associated with a respective neural network topology type; and map the plurality of synapse weights to locations in the memory based on the identified synapse memory mapping scheme.

In an embodiment, a first synapse memory mapping scheme of the plurality of synapse memory mapping schemes is associated with a first neural network topology type comprising a feed-forward neural network and a second synapse memory mapping scheme of the plurality of synapse memory mapping schemes is associated with second network topology type comprising a convolutional neural network. In an embodiment, a third synapse memory mapping scheme of the plurality of synapse memory mapping schemes is associated with a third neural network topology type comprising a recurrent neural network. In an embodiment, the memory includes a plurality of independently accessible banks and the identified synapse memory mapping scheme specifies the storage of fan-out synapse weights of a first neuron in separate banks of the memory to enable parallel access of the fan-out synapse weights by the first neuron. In an embodiment, the memory includes a plurality of independently accessible banks and the identified synapse memory mapping scheme specifies the storage of fan-in synapse weights of a first neuron in separate banks of the memory to enable parallel access of the fan-in synapse weights by the first neuron. In an embodiment, the processor is to access synapse weights connected to a neuron of the neuromorphic processor based on a memory address including at least one wildcard bit, wherein the memory address identifies locations in the memory of the synapse weights connected to the neuron. In an embodiment, the identified synapse memory mapping scheme specifies a pseudorandom sparse connectivity scheme for a first group of rows of the memory In an embodiment, the identified synapse memory mapping scheme specifies a location for a synapse weight of the plurality of synapse weights based on an XOR operation between a row of the memory and a bank of the memory. In an embodiment, the identified synapse memory mapping scheme specifies a location for a synapse weight of the plurality of synapse weights based on an arithmetic operation including a position of the synapse weight within an ordered list of synapse weights and a position of a neuron connected to the synapse weight within an ordered list of neurons. In an embodiment, the memory comprises a plurality of memory elements distributed among a plurality of synaptic cores of a network on chip.

In at least one embodiment, a method comprises receiving a selection of a neural network topology type; identifying a synapse memory mapping scheme for the selected neural network topology type from a plurality of synapse memory mapping schemes that are each associated with a respective neural network topology type; and mapping a plurality of synapse weights to locations in a memory based on the identified synapse memory mapping scheme.

In an embodiment, a first synapse memory mapping scheme of the plurality of synapse memory mapping schemes is associated with a first neural network topology type comprising a feed-forward neural network and a second synapse memory mapping scheme of the plurality of synapse memory mapping schemes is associated with second network topology type comprising a convolutional neural network. In an embodiment, a third synapse memory mapping scheme of the plurality of synapse memory mapping schemes is associated with a third neural network topology type comprising a recurrent neural network. In an embodiment, the memory includes a plurality of independently accessible banks and the identified synapse memory mapping scheme specifies the storage of fan-out synapse weights of a first neuron in separate banks of the memory to enable parallel access of the fan-out synapse weights by the first neuron. In an embodiment, the memory includes a plurality of independently accessible banks and the identified synapse memory mapping scheme specifies the storage of fan-in synapse weights of a first neuron in separate banks of the memory to enable parallel access of the fan-in synapse weights by the first neuron. In an embodiment, a method further comprises accessing synapse weights connected to a neuron of the neuromorphic processor based on a memory address including at least one wildcard bit, wherein the memory address identifies locations in the memory of the synapse weights connected to the neuron. In an embodiment, the identified synapse memory mapping scheme specifies a pseudorandom sparse connectivity scheme for a first group of rows of the memory. In an embodiment, the identified synapse memory mapping scheme specifies a location for a synapse weight of the plurality of synapse weights based on an XOR operation between a row of the memory and a bank of the memory. In an embodiment, the identified synapse memory mapping scheme specifies a location for a synapse weight of the plurality of synapse weights based on an arithmetic operation including a position of the synapse weight within an ordered list of synapse weights and a position of a neuron connected to the synapse weight within an ordered list of neurons. In an embodiment, the memory comprises a plurality of memory elements distributed among a plurality of synaptic cores of a network on chip. In an embodiment, a method further comprises storing addresses of fan-out synapses of a neuron in a neuron core. In an embodiment, a method further comprises storing addresses of fan-in synapses of a neuron in a neuron core.

In at least one embodiment, a non-transitory machine readable storage medium having instructions stored thereon, the instructions when executed by a machine to cause the machine to receive a selection of a neural network topology type; identify a synapse memory mapping scheme for the selected neural network topology type from a plurality of synapse memory mapping schemes that are each associated with a respective neural network topology type; and map a plurality of synapse weights to locations in a memory based on the identified synapse memory mapping scheme.

In an embodiment, a first synapse memory mapping scheme of the plurality of synapse memory mapping schemes is associated with a first neural network topology type comprising a feed-forward neural network and a second synapse memory mapping scheme of the plurality of synapse memory mapping schemes is associated with second network topology type comprising a convolutional neural network. In an embodiment, a third synapse memory mapping scheme of the plurality of synapse memory mapping schemes is associated with a third neural network topology type comprising a recurrent neural network. In an embodiment, the memory includes a plurality of independently accessible banks and the identified synapse memory mapping scheme specifies the storage of fan-out synapse weights of a first neuron in separate banks of the memory to enable parallel access of the fan-out synapse weights by the first neuron. In an embodiment, the memory includes a plurality of independently accessible banks and the identified synapse memory mapping scheme specifies the storage of fan-in synapse weights of a first neuron in separate banks of the memory to enable parallel access of the fan-in synapse weights by the first neuron.

In at least one embodiment, a system comprises means for receiving a selection of a neural network topology type; means for identifying a synapse memory mapping scheme for the selected neural network topology type from a plurality of synapse memory mapping schemes that are each associated with a respective neural network topology type;

and means for mapping a plurality of synapse weights to locations in a memory based on the identified synapse memory mapping scheme.

In an embodiment, a first synapse memory mapping scheme of the plurality of synapse memory mapping schemes is associated with a first neural network topology type comprising a feed-forward neural network and a second synapse memory mapping scheme of the plurality of synapse memory mapping schemes is associated with second network topology type comprising a convolutional neural network. In an embodiment, a third synapse memory mapping scheme of the plurality of synapse memory mapping schemes is associated with a third neural network topology type comprising a recurrent neural network. In an embodiment, the memory includes a plurality of independently accessible banks and the identified synapse memory mapping scheme specifies the storage of fan-out synapse weights of a first neuron in separate banks of the memory to enable parallel access of the fan-out synapse weights by the first neuron. In an embodiment, the memory includes a plurality of independently accessible banks and the identified synapse memory mapping scheme specifies the storage of fan-in synapse weights of a first neuron in separate banks of the memory to enable parallel access of the fan-in synapse weights by the first neuron.

In at least one embodiment, a system comprises a neuromorphic processor comprising a memory to store a plurality of synapse weights of a neural network; and logic to implement a plurality of neurons of the neural network; an input/output interface; and a synapse memory mapping engine to receive a selection of a neural network topology type, the selection to be received via the input/output interface; identify a synapse memory mapping scheme for the selected neural network topology type from a plurality of synapse memory mapping schemes that are each associated with a respective neural network topology type; and map the plurality of synapse weights to locations in the memory based on the identified synapse memory mapping scheme.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
  a memory to store a plurality of synapse weights of a neural network, the memory comprising a plurality of simultaneously accessible independent banks, a respective bank comprising a plurality of rows, a respective row comprising storage for at least one synapse weight;
  at least one neuron core comprising logic associated with a plurality of neurons;
  a synapse memory mapping engine to:
    receive a selection of a neural network topology type;
    identify a synapse memory mapping scheme for the selected neural network topology type from a plurality of synapse memory mapping schemes that are each associated with a respective neural network topology type; and
    map the plurality of synapse weights to locations in the memory based on the identified synapse memory mapping scheme; and
  when mapped to a first synapse memory mapping scheme, the plurality of banks are to store fan-out synapse weights representing weights of synapses between a neuron of a first layer and a plurality of neurons of a second layer such that a first parallel access of the plurality of banks at a first row is to output the fan-out synapse weights, and the plurality of banks are to store fan-in synapse weights representing weights of synapses between a neuron of the second layer and a plurality of neurons of the first layer such that a second parallel access of the plurality of banks at a different row for each bank accessed is to output the fan-in synapse weights.

2. The processor of claim 1, wherein the first synapse memory mapping scheme of the plurality of synapse memory mapping schemes is associated with a first neural network topology type comprising a generative neural network and a second synapse memory mapping scheme of the plurality of synapse memory mapping schemes is associated with a second network topology type comprising a convolutional neural network.

3. The processor of claim 2, wherein a third synapse memory mapping scheme of the plurality of synapse memory mapping schemes is associated with a third neural network topology type comprising a recurrent neural network.

4. The processor of claim 1, wherein the processor is to access synapse weights connected to a neuron of the processor based on a memory address including at least one wildcard bit, wherein the memory address identifies locations in the memory of the synapse weights connected to the neuron.

5. The processor of claim 1, wherein the identified synapse memory mapping scheme specifies a pseudorandom sparse connectivity scheme for a first group of rows of the memory.

6. The processor of claim 1, wherein the identified synapse memory mapping scheme specifies a location for a synapse weight of the plurality of synapse weights based on an arithmetic operation including a position of the synapse weight within an ordered list of synapse weights and a position of a neuron connected to the synapse weight within an ordered list of neurons.

7. The processor of claim 1, wherein the memory comprises a plurality of memory elements distributed among a plurality of synaptic cores of a network on chip.

8. A method comprising:
  receiving a selection of a neural network topology type;
  identifying a synapse memory mapping scheme for the selected neural network topology type from a plurality of synapse memory mapping schemes that are each associated with a respective neural network topology type; and mapping a plurality of synapse weights to locations in a memory based on the identified synapse memory mapping scheme;

wherein the memory comprises a plurality of simultaneously accessible independent banks, a respective bank comprising a plurality of rows, a respective row comprising storage for at least one synapse weight; and wherein, when mapped to a first synapse memory mapping scheme, the plurality of banks are to store fan-out synapse weights representing weights of synapses between a neuron of a first layer and a plurality of neurons of a second layer such that a first parallel access of the plurality of banks at a first row is to output the fan-out synapse weights, and the plurality of banks are to store fan-in synapse weights representing weights of synapses between a neuron of the second layer and a plurality of neurons of the first layer such that a second parallel access of the plurality of banks at a different row for each bank accessed is to output the fan-in synapse weights.

9. The method of claim 8, wherein the first synapse memory mapping scheme of the plurality of synapse memory mapping schemes is associated with a first neural network topology type comprising a generative neural network and a second synapse memory mapping scheme of the plurality of synapse memory mapping schemes is associated with a second network topology type comprising a convolutional neural network.

10. The method of claim 9, wherein a third synapse memory mapping scheme of the plurality of synapse memory mapping schemes is associated with a third neural network topology type comprising a recurrent neural network.

11. A non-transitory machine readable storage medium having instructions stored thereon, the instructions when executed by a machine to cause the machine to:
receive a selection of a neural network topology type;
identify a synapse memory mapping scheme for the selected neural network topology type from a plurality of synapse memory mapping schemes that are each associated with a respective neural network topology type; and
map a plurality of synapse weights to locations in a memory based on the identified synapse memory mapping scheme;
wherein the memory comprises a plurality of simultaneously accessible independent banks, a respective bank comprising a plurality of rows, a respective row comprising storage for at least one synapse weight; and
wherein, when mapped to a first synapse memory mapping scheme, the plurality of banks are to store fan-out synapse weights representing weights of synapses between a neuron of a first layer and a plurality of neurons of a second layer such that a first parallel access of the plurality of banks at a first row is to output the fan-out synapse weights, and the plurality of banks are to store fan-in synapse weights representing weights of synapses between a neuron of the second layer and a plurality of neurons of the first layer such that a second parallel access of the plurality of banks at a different row for each bank accessed is to output the fan-in synapse weights.

12. The medium of claim 11, wherein the first synapse memory mapping scheme of the plurality of synapse memory mapping schemes is associated with a first neural network topology type comprising a generative neural network and a second synapse memory mapping scheme of the plurality of synapse memory mapping schemes is associated with a second network topology type comprising a convolutional neural network.

13. The medium of claim 12, wherein a third synapse memory mapping scheme of the plurality of synapse memory mapping schemes is associated with a third neural network topology type comprising a recurrent neural network.

14. The medium of claim 11, wherein the memory includes a plurality of independently accessible banks and the identified synapse memory mapping scheme specifies the storage of fan-out synapse weights of a first neuron in separate banks of the memory to enable parallel access of the fan-out synapse weights by the first neuron.

15. The medium of claim 11, wherein the memory includes a plurality of independently accessible banks and the identified synapse memory mapping scheme specifies the storage of fan-in synapse weights of a first neuron in separate banks of the memory to enable parallel access of the fan-in synapse weights by the first neuron.

16. A system comprising:
a neuromorphic processor comprising:
a memory to store a plurality of synapse weights of a neural network, the memory comprising a plurality of simultaneously accessible independent banks, a respective bank comprising a plurality of rows, a respective row comprising storage for at least one synapse weight; and
logic to implement a plurality of neurons of the neural network;
an input/output interface; and
a synapse memory mapping engine to:
receive a selection of a neural network topology type, the selection to be received via the input/output interface;
identify a synapse memory mapping scheme for the selected neural network topology type from a plurality of synapse memory mapping schemes that are each associated with a respective neural network topology type; and
map the plurality of synapse weights to locations in the memory based on the identified synapse memory mapping scheme; and
when mapped to a first synapse memory mapping scheme, the plurality of banks are to store fan-out synapse weights representing weights of synapses between a neuron of a first layer and a plurality of neurons of a second layer such that a first parallel access of the plurality of banks at a first row is to output the fan-out synapse weights, and the plurality of banks are to store fan-in synapse weights representing weights of synapses between a neuron of the second layer and a plurality of neurons of the first layer such that a second parallel access of the plurality of banks at a different row for each bank accessed is to output the fan-in synapse weights.

17. The system of claim 16, wherein the first synapse memory mapping scheme of the plurality of synapse memory mapping schemes is associated with a first neural network topology type comprising a generative neural network and a second synapse memory mapping scheme of the plurality of synapse memory mapping schemes is associated with second network topology type comprising a convolutional neural network.

18. The system of claim 17, wherein a third synapse memory mapping scheme of the plurality of synapse memory mapping schemes is associated with a third neural network topology type comprising a recurrent neural network.

19. The system of claim 16, wherein the memory includes a plurality of independently accessible banks and the identified synapse memory mapping scheme specifies the storage of fan-out synapse weights of a first neuron in separate banks of the memory to enable parallel access of the fan-out synapse weights by the first neuron.

20. The system of claim 16, wherein the memory includes a plurality of independently accessible banks and the identified synapse memory mapping scheme specifies the storage of fan-in synapse weights of a first neuron in separate banks of the memory to enable parallel access of the fan-in synapse weights by the first neuron.

21. The processor of claim 1, wherein the parallel access of the fan-out synapse weights by the first neuron or parallel access of the fan-in synapse weights by the first neuron comprises performing an XOR operation on an index specifying a row of the memory.

22. The processor of claim 1, wherein a neuron core of the at least one neuron core is to access synapse weights connected to the first neuron based on a memory address including at least one wildcard bit, wherein the memory address identifies locations in the memory of the synapse weights connected to the first neuron.

23. The method of claim 8,
wherein the method further comprises accessing synapse weights connected to a neuron based on a memory address including at least one wildcard bit, wherein the memory address identifies locations in the memory of the synapse weights connected to the neuron, and
wherein address bits of the memory address are grouped into pairs to enable encoding of the at least one wildcard bit.

24. The processor of claim 1, wherein the banks are collocated in a common synapse core, wherein the common synapse core includes a synapse array memory to store a plurality of synapse weights, logic to write synapse weights to the synapse array memory, and logic to access the synapse weights.

25. The processor of claim 1, wherein a first bank of the banks is located in a first synapse core and a second bank of the banks is located in a second synapse core, wherein the first synapse core and the second synapse core each comprise a respective synapse array memory to store a plurality of synapse weights, logic to write synapse weights to the respective synapse array memory, and logic to access the synapse weights.

26. The processor of claim 1, wherein the banks are respective static random access memories.

* * * * *